(12) United States Patent
Good et al.

(10) Patent No.: US 7,228,507 B2
(45) Date of Patent: Jun. 5, 2007

(54) METHODS AND SYSTEMS FOR NAVIGATING A WORKSPACE

(75) Inventors: Lance E. Good, Cupertino, CA (US); Mark J. Stefik, Portola Valley, CA (US)

(73) Assignee: Xerox Corporation, Stamford, CT (US)

(*) Notice: Subject to any disclaimer, the term of this patent is extended or adjusted under 35 U.S.C. 154(b) by 860 days.

(21) Appl. No.: 10/369,612

(22) Filed: Feb. 21, 2003

(65) Prior Publication Data

US 2003/0156141 A1 Aug. 21, 2003

Related U.S. Application Data

(60) Provisional application No. 60/357,850, filed on Feb. 21, 2002.

(51) Int. Cl.
 *G06F 3/048* (2006.01)
(52) U.S. Cl. ............... 715/778; 715/811; 715/825; 715/812; 715/822
(58) Field of Classification Search ............... 715/854, 715/738, 739, 767, 802, 838, 778, 811, 825, 715/812, 822, 704, 501.1
 See application file for complete search history.

(56) References Cited

U.S. PATENT DOCUMENTS

| | | | | |
|---|---|---|---|---|
| 5,077,668 A | 12/1991 | Doi | .................... | 364/419 |
| 5,257,186 A | 10/1993 | Ukita et al. | .............. | 364/419.1 |
| 5,278,980 A | 1/1994 | Pedersen et al. | ............ | 395/600 |
| 5,339,391 A | 8/1994 | Wroblewski et al. | ....... | 395/157 |
| 5,384,703 A | 1/1995 | Withgott et al. | ....... | 364/419.19 |
| 5,479,600 A | 12/1995 | Wroblewski et al. | ....... | 395/157 |
| 5,682,550 A * | 10/1997 | Brown et al. | ................. | 710/10 |
| 5,689,716 A | 11/1997 | Chen | ......................... | 395/761 |
| 5,692,143 A * | 11/1997 | Johnson et al. | ............. | 715/764 |
| 5,745,602 A | 4/1998 | Chen et al. | ................. | 382/229 |
| 5,778,397 A | 7/1998 | Kupiec et al. | ............. | 707/500 |
| 5,799,292 A * | 8/1998 | Hekmatpour | ........ | 715/501.1 X |
| 5,838,323 A | 11/1998 | Rose et al. | ................. | 345/349 |
| 5,867,164 A | 2/1999 | Bornstein et al. | ........... | 345/357 |
| 5,918,240 A | 6/1999 | Kupiec et al. | ............. | 707/531 |
| 5,924,108 A | 7/1999 | Fein et al. | .................. | 707/531 |

(Continued)

OTHER PUBLICATIONS

"Internet Browser Bookmark Locator by Color", IBM Technical Disclosure Bulletin, Issue 429, p. 176, Jan. 1, 2000.*

(Continued)

*Primary Examiner*—Raymond J. Bayerl
(74) *Attorney, Agent, or Firm*—Oliff & Berridge, PLC; Eugene Palazzo

(57) ABSTRACT

When a user is engaged in sensemaking using a media, the user's work involves navigating to previously visited view places in the workspace. To achieve this, a workspace is navigated by obtaining a history list that may include a degree of interest and/or location information related to previous view places, and navigating the workspace based on the history list. The workspace may be further navigated by retrieving the location information related to one of the previous view places from the history list, and displaying the previous places based on the location information. The history list may be constructed by detecting an activity in a current view place, determining a degree of interest of the current view place based on the activity, and storing the degree of interest and the location information.

38 Claims, 10 Drawing Sheets

U.S. PATENT DOCUMENTS

| | | | | |
|---|---|---|---|---|
| 5,978,820 | A | 11/1999 | Mase et al. | 707/531 |
| 6,133,916 | A * | 10/2000 | Bukszar et al. | 715/853 X |
| 6,185,592 | B1 | 2/2001 | Boguraev et al. | 707/531 |
| 6,195,679 | B1 * | 2/2001 | Bauersfeld et al. | 715/738 X |
| 6,243,093 | B1 | 6/2001 | Czerwinski et al. | 345/355 |
| 6,289,304 | B1 | 9/2001 | Grefenstette | 704/9 |
| 6,847,387 | B2 * | 1/2005 | Roth | 715/811 |
| 6,966,038 | B1 * | 11/2005 | Shaver et al. | 715/854 |
| 2001/0038394 | A1 * | 11/2001 | Tsuchimura et al. | 345/811 |
| 2002/0149615 | A1 * | 10/2002 | Rajarajan et al. | 345/738 |

OTHER PUBLICATIONS

E. Ayers et al., "Using Graphic History in Browsing the World Wide Web", The 4th International World Wide Web Conference, www.w3.org/Conferences/WWW4/Program_Full.html, Dec. 11-14, 1996.

B. Bederson et al., Jazz: An Extensible Zoomable User Interface Graphics Toolkit in Java., *Proceedings of UIST 2000*, pp. 171-180, (2000).

T. Berlage, "A Selective Undo Mechanism for Graphical user Interfaces Based on Command Objects", *ACM Transactions on Computer-Human Interaction*, vol. 1, No. 3, pp. 269-294, 1994.

R. Gandhi et al., "Domain Name Based Visualization of Web Histories in a Zoomable User Interface", In Proceedings of 11th International Workshop on Database and Expert Systems Applications—Second International Workshop on Web-Based Information Visualization (WebVis 2000), *IEEE Computer Society*, pp. 591-598, 2000.

R. Hightower et al., "PadPrints: Graphical Multiscale Web Histories", *Proceedings of UIST*, pp. 121-122, 1998.

W. Hill et al., "Edit Wear and Read Wear", *Proceedings of CHI '92*, pp. 3-9.

D. Kurlander et al., "Editable Graphical Histories", *IEEE 1988 Workshop on Visual Languages*, pp. 416-423, 1988.

B. Myers et al., "A Multi-View Intelligent Editor for Digital Video Libraries", *Intelligent Editor for Digital Video Libraries*, submitted for publication, pp. 1-10, 2001.

C. Ahlberg et al., "The Alphaslider: A Compact and Rapid Selector", *Proceedings of CHI*, pp. 365-371, 1994.

Y. Ayatsuka et al., "Popup Vernier: a Tool for Sub-pixel-pitch Dragging with Smooth Mode Transition", *Proceedings of UIST*, pp. 39-48, 1998.

T. Ball et al., "Software Visualization in the Large", *IEEE Computer*, vol. 29, No. 4, pp. 33-43, 1996.

B. Bederson et al., "Pad++: A Zoomable Graphical Sketchpad For Exploring Alternate Interface Physics", *Journal of Visual Languages and Computing*, vol. 7, pp. 3-31, 1996.

D. Byrd, "A Scrollbar-based Visualization for Document Navigation", *Proceedings of the fourth ACM conference on Digital Libraries*, pp. 122-129, 1999.

D. Cox et al., "The Usability of Transparent Overview Layers", *Proceedings of CHI*, pp. 301-302, 1998.

A. Dieberger et al., "A City Metaphor to Support Navigation in Complex Information Spaces", *Journal of Visual Languages and Computing*, vol. 9, pp. 597-622, 1998.

G. Furnas, "Generalized Fisheye Views", *Proceedings of CHI*, pp. 16-23, 1986.

C. Manning et al., "Dirty Hands", *Foundations of Statistical Natural Language Processing*, MIT Press, pp. 31-34, 1999.

M. Hearst, "TileBars: Visualization of Term Distribution Information in Full Text Information Access." *Proceedings of CHI '95*, pp. 59-66, 1995.

T. Masui, "LensBar- Visualization for Browsing and Filtering Large Lists of Data", *Proceedings of Info Vis*, 1998.

S. McCrickard et al., "Beyond the Scrollbar: An Evolution and Evaluation of Alternative Navigation Techniques", *Proceedings of the IEEE Symposium on Visual Languages*, pp. 270-277, 1999.

S. Pook et al., "Context and Interaction in Zoomable User Interfaces", *Proceedings of the ACM Conference on Advanced Visual Interfaces*, pp. 227-231 & 317, 2000.

F. Shipman et al., "Beyond Location: Hypertext Workspaces and Non-Linear Views", *Proceedings of the Tenth ACM Conference on Hypertext and Hypermedia*, pp. 121-130, 1999.

B. Shneiderman, "Designing the User Interface: Strategies for Effective Human Computer Interaction", *Addison-Wesley*, pp. 451-452, 1998.

R. Spence et al., "Data Base Navigation: An Office Environment for the Professional", *Behavior and Information Technology*, pp. 43-54, 1982.

G. Robertson et al., "The Document Lens", *Proceedings of UIST'93*, pp. 101-108, 1993.

B. Bederson et al., "Implementing a Zooming User Interface: Experience Building Pad++", *Software: Practice and Experience*, vol. 28, No. 10, pp. 1101-1135, 1998.

S. Card et al., "Degree-of-Interest Trees: A Component of an Attention-Responsive User Interface", submitted to CHI, 2002.

D. Nation et al., "Browse Hierarchical Data with the Degree of Interest Tree", submitted to CHI, 2002.

K. Perlin et al., "Pad: An Alternative Approach to the Computer Interface", *Proceedings of 1993 ACM SIGGRAPH Conference*, pp. 57-64, 1993.

O. Buyukkokten et al., "Accordion Summarization for End-Game Browsing on PDAs and Cellular Phones", *CHI 2001*, pp. 213-220, 2001.

M. Czerwinski et al., "Visualizing Implicit Queries For Information Management and Retrieval", *Proceedings of CHI'99*, pp. 560-567, 1999.

D. Hederson, Jr. et al., "Rooms: The Use of Multiple Virtual Workspaces to Reduce Space Contention in a Window-Based Graphical User Interface", *ACM Transactions on Grpahics*, vol. 5, No. 3, pp. 211-243, 1986.

D. Jerding et al., "The Information Mural: A Technique for Displaying and Navigating Large Information Spaces", *IEEE Transactions on Visualization and Computer Graphics*, vol. 4, No. 3, pp. 257-271, 1998.

T. Malone, How Do People Organize Their Desks! Implications for the Design of Office Information Systems, *ACM Transactions on Office Information Systems*, vol. 1, No. 1, pp. 99-112, 1983.

M. Stefik et al., Beyond the Chalkboard: Computer Support for Collaboration and Problem Solving in Meetings, *Communications of the ACM*, vol. 30, No. 1, pp. 32-47, 1987.

A. Woodruff et al., "Using Thumbnails to Search the Web", *Conference Proceedings of CHI 2001*, vol. 3, Issue 1, pp. 198-205, 552, 2001.

W. Estes, Classification and Cognition, New York: Oxford University Press, pp. 32-87, 1994.

K. Knight et al., "Statistics-Based Summarization—Step One: Sentence Compression", *American Association for Artificial Intelligence*, 2000.

M. Mills et al., "A Magnifier Tool for Video Data", *CHI '92*, pp. 93-98, 1992.

Co-pending U.S. Appl. No. 10/369,613 to Benjamin Bederson et al.., filed Feb. 21, 2003, entitled Methods and Systems for Incrementally Changing Text Representation.

Co-pending U.S. Appl. No. 10/369,617 to Lance E. Good et al.., filed Feb. 21, 2003, entitled Methods and Systems for Indicating Invisible Contents of Workspace.

Co-pending U.S. Appl. No. 10/369,624 to Lance E. Good et al., filed Feb. 21, 2003, entitled Methods and Systems for Interactive Classification of Objects.

Co-pending U.S. Appl. No. 10/369,614 to Benjamin Bederson et al., filed Feb. 21, 2003, entitled Methods and Systems for Incrementally Changing Text Representation.

* cited by examiner

Stored Place List

| View Place #101 | DOI: 10 |
| View Place #203 | DOI: 08 |
| View Place #138 | DOI: 07 |
| View Place #413 | DOI: 03 |
| View Place #751 | DOI: 02 |

New Place

| View Place #729 | DOI: 06 |

(insert)

Fig. 4

METHODS AND SYSTEMS FOR NAVIGATING A WORKSPACE

This non-provisional application claims the benefit of U.S. Provisional Application No. 60/357,850, entitled "Zooming Interfaces For Sensemaking, Visualization, and Navigation" which was filed on Feb. 21, 2002, and is hereby incorporated by reference in its entirety.

RELATED APPLICATIONS

The following related U.S. patent applications are hereby incorporated herein by reference in their entirety:

U.S. patent application Ser. No. 10/371,017 entitled "System and Method for Interaction of Graphical Objects on a Computer Controlled System";

U.S. Pat. No. 7,068,288 entitled "System and Method for Moving Graphical Objects on a Computer Controlled System";

U.S. patent application Ser. No. 10/369,613 entitled "Method and System for Incrementally Changing Text Representation";

U.S. patent application Ser. No. 10/369,614 entitled "Method and System for Incrementally Changing Text Representation";

U.S. patent application Ser. No. 10/369,624 entitled "Methods and Systems for Interactive Classification of Objects"; and U.S. patent application Ser. No. 10/369,617 entitled "Methods and Systems for Indicating Invisible Contents of Workspace".

BACKGROUND OF THE INVENTION

1. Field of Invention

The present invention relates to methods and systems for navigating a workspace.

2. Description of Related Art

As the amount of information in our lives continues to grow, people want new and effective ways of finding and using it. "Sensemaking" is a process of gathering, understanding, and using information for a purpose. Sensemaking tasks often involve searching for relevant documents and then extracting and reformulating information so that it can be better for utilizing the information. Making a report is an example of a sensemaking task. A sensemaker performing this task has many interrelated and possibly interwoven subtasks. One way or another, a sensemaker gathers information, identifies and extracts portions of it, organizes these portions for efficient use, and ultimately incorporates the information in a work product with the required logical and rhetorical structure.

Many kinds of information work involve workspace navigating, i.e., moving the focus of activity through a workspace. A workspace is one large space in which objects, such as text objects and/or other objects, are present at various locations. A workspace may be a two-dimensional workspace, in which objects have a defined positional relationship and are represented on a coplanar or substantially coplanar virtual surface that can be scrolled and/or panned on a computer monitor to bring the different places of the surface into view. Even a single document may be a workspace, with different portions of the document text considered as different objects. However, a workspace does not necessarily have to be two-dimensional, and may, for example, include a plurality of separate documents stored in a computer hard drive or the like, which a user can selectively access and view and/or edit. As another non-two-dimensional example, web pages linked by the Internet or another type of network, at which a user temporarily or permanently alters content, e.g., by engaging in interactive activities, leaving a message on a message board, or the like, may be considered a workspace.

When a user works on sensemaking using a computer, a user initially focuses on and works in one view place in the workspace and then from time to time moves to different view places, relating to the same or different subjects, within the same workspace. To move to different view places, because of limitations on the field of view of a screen, the user often pans or scrolls the view to access other view places in the workspace. The user often desires to go back to view and/or work in previous view places in the workspace.

Systems that support the action of returning to a previous view place in a workspace provide a way to mark, or "memorize," places of interest and to go back to these places from subsequently visited places in the workspace.

For example, web browsers provide "bookmarks" for returning to previously visited web pages by storing locations, such as Uniform Resource Locator (URL) information of web pages of interest, and a "Back" button for returning sequentially to previously visited pages.

Such web browsers also provide a "Forward" button for allowing the user to move forward in sequence to previously visited web pages, after returning from those pages using the "Back" button.

SUMMARY OF THE INVENTION

A "view place" is a subset of a workspace. Returning to a view place involves moving back to an earlier location in the workspace and viewing previously viewed objects at that location, i.e., recovering what the user was seeing while last visiting that view place.

The process of switching back and forth between view places can leave a lot of "dangling threads" or "potentially resumable view places." Resuming work at a previous view place requires more than returning to an earlier state of mind. When a user is engaged in sensemaking using a blackboard or digital workspace, for example, then resuming previous work involves navigating to an appropriate view place in the workspace. Returning to the view place in the workspace can help the user to refresh the user's short-term memory, that is, remind the user about what the user was doing so that he/she can quickly resume doing it.

The present invention provides systems and methods for effectively navigating to previously visited view places in a workspace based on a user's degree of interest in these view places. To achieve this process, the present invention provides a selection of one or more available previous view places to which to return based on a history list, the history list including a degree of interest and location information of the one or more previous view places. When a user's selection of a previous view place is received, the selected view place is displayed.

The history list may be created by detecting a view place of an activity in a workspace, determining a degree of interest of the view place based on the activity, and storing the degree of interest and location information of the view place in the history list. The history list may include degree of interest and location information of a predetermined number of view places.

These and other objects, advantages and salient features of the invention are described in or apparent from the following description of various exemplary embodiments.

BRIEF DESCRIPTION OF THE DRAWINGS

Various exemplary embodiments of this invention are described in detail, with reference to the following figures, wherein:

FIG. 4 shows construction and maintenance of an exemplary history list;

DETAILED DESCRIPTION OF PREFERRED EMBODIMENTS

Techniques for navigating a workspace according to the invention can be used to increase a user's flexibility to navigate to previously visited view places in a workspace, based on a determination of interest or importance of the view places, without losing existing information. Navigating a workspace includes returning to a view place in such a way that visible objects in the view place may, at least initially, have the same appearance as before despite the fact that the contents or position may have been modified, added and/or deleted since the last visit to the view place by the user.

This is done by, for example, determining a degree of interest of the view place and storing the degree of interest along with other information of the view place, such as location information of the view place. The location information may be coordinates of the view place, network addresses, a uniform resource locater (URL), and the like.

Figure 1:
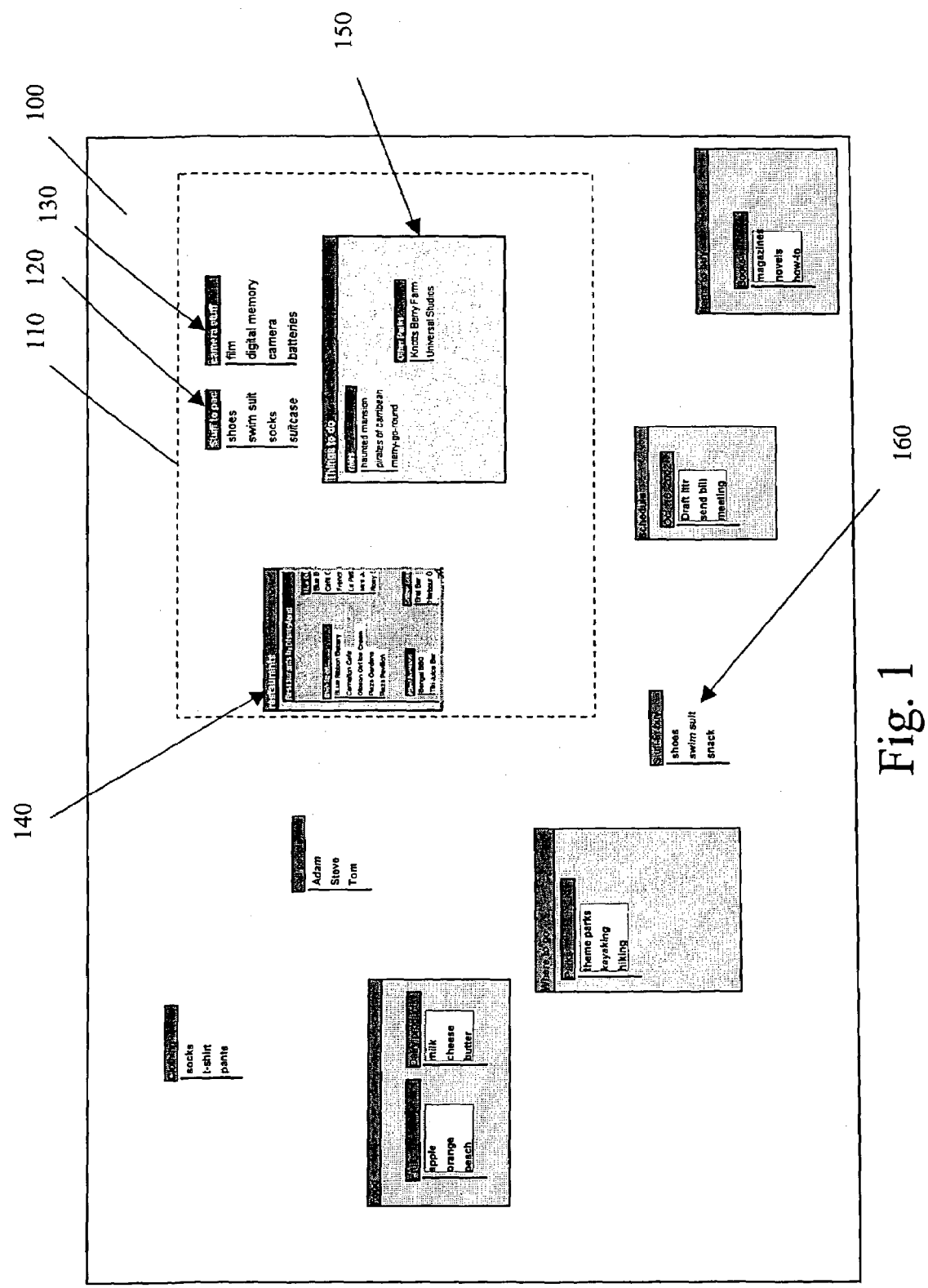
FIG. 1 shows an exemplary embodiment of a workspace according to this invention.

FIG. 1 shows an exemplary embodiment of a workspace 100 according to this invention. It is possible to implement such a workspace in a system such as is disclosed in co-pending, co-assigned U.S. patent application Ser. No. 10/371,017 entitled "System and Method for Interaction of Graphical Objects on A Computer Controlled System", incorporated herein by reference in its entirety, or in any other suitable known or later developed system. The workspace 100 may be or include a part or all of the Internet, including various web pages. In such a case, various web pages may be part of the workspace, and may be linked to each other.

As shown in FIG. 1, the workspace 100 may have objects 120-160. As shown by dotted lines, a view place 110 is part of the workspace 100, and in this exemplary embodiment, the view place 110 corresponds in size to a display screen (not shown). The workspace 100 may be any size, and the size may be changeable. The view place 110 may also be any size. The user may scroll and/or pan to see a different view place. In addition, a magnification of the view place 110 may be changed to see more details of the contents of the view place 110. The magnification may be considered as part of the view place 110, or may be considered a new view place.

Figure 2:
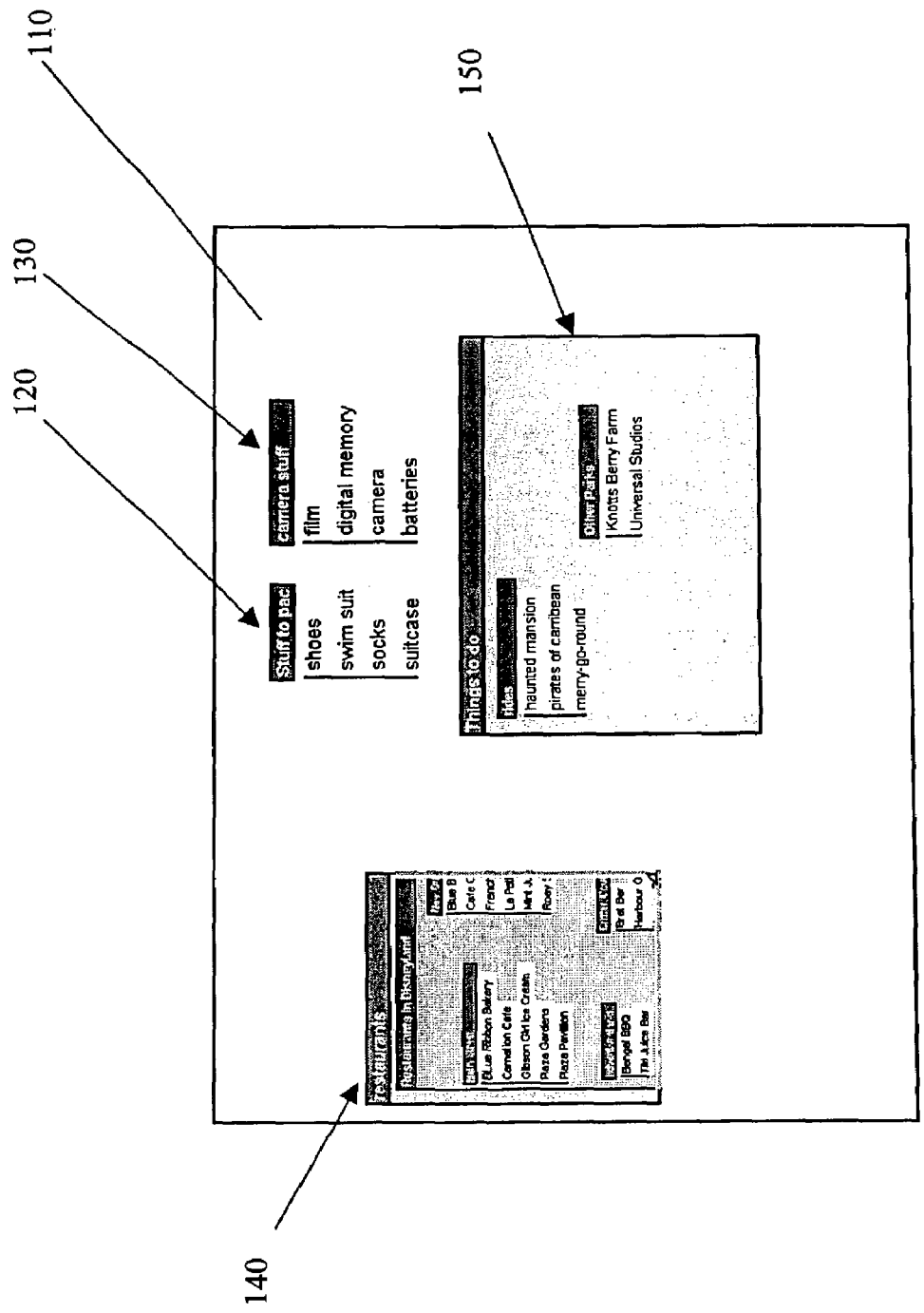
FIG. 2 shows an enlarged view of a view place of the workspace shown in FIG. 1.

As shown in FIG. 2, objects 120-150 may be present in a view place. The types of objects may include, but are not limited to, text, images, and multimedia data such as still and/or moving pictures. The user may also be able to modify, move or delete any of the objects and/or a portion or all of the contents of any object in the workspace 100. As shown in FIG. 2, object 160 is out of the view place 110 and therefore cannot be seen in the display.

The user may work anywhere in the workspace 100 at any time. For example, the user may create an object 120 including, for example, a list called "stuff to pack," and enter items into the list as desired. The user may then create another object 130 including, for example, a list called "camera stuff," and enter items into the list as desired. After creating the object 130, the user may be able to return to the object 120 and continue working on the list.

In addition, the user may be able to adjust the size of an object and/or the size of the contents of an object, to make other areas available for other entries. For example, in objects 140 and 150, some of the entries in the object 140 may become invisible, that is, may be hidden outside the boundary of the object 140. When the user desires to view the entire object 140, the user may do so by, for example, selecting a selectable element of the object 140, e.g., by clicking on a menu bar or the like, or by manually enlarging the size of the object 140, e.g., by clicking and dragging to widen an edge or a corner of the object 140. The user may also be able to reduce the size or completely hide the contents by, for example, clicking the menu bar again or clicking and dragging an edge or corner of the workspace.

Figure 3:
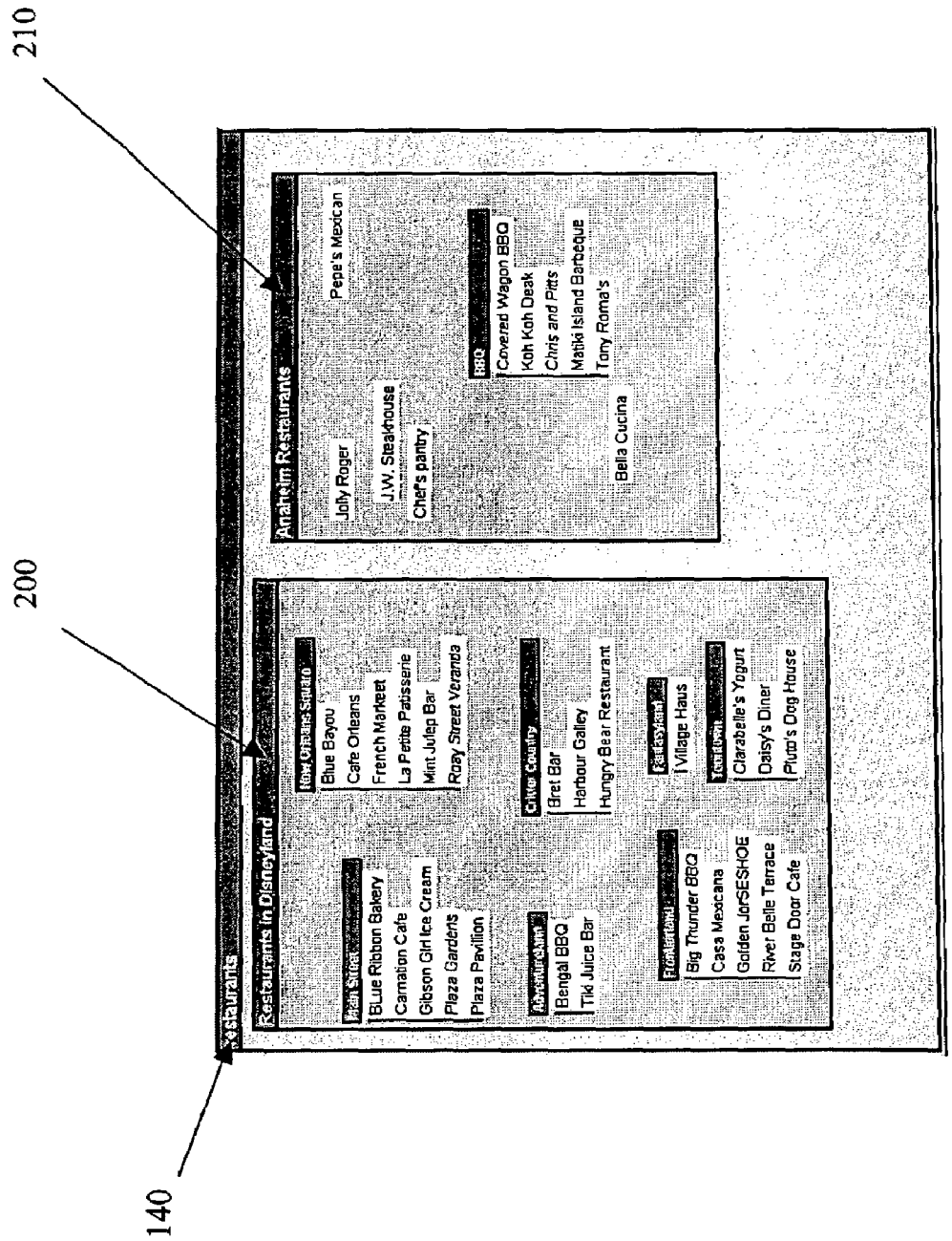
FIG. 3 shows a view of an enlarged object in the view place of FIG. 2.

FIG. 3 shows an enlarged version of the object 140 shown in FIG. 2. In the object 140, there are sub-objects 200 and 210. In each of the sub-objects 200 and 210, there may be entries, such as lists of items. When the object 140 is in the enlarged state, as shown in FIG. 3, other objects 120-130 and 150 maybe hidden from view.

The user can add, modify, move or delete entries within the object 140. The user may then desire to move to another object, such as the object 150. At that time, the user may, for example, reduce the size of the object 140 or minimize the object 140 such that the object 150 becomes visible. In addition, it may be possible to move a sub-object(s) from one object to another object.

After working on one object, the user may desire to return to another object on which the user worked previously. For example, after working on the object 150, the user may desire to work on the object 140 again.

Exemplary techniques for navigating the workspace 100 are described below.

In the technology of a scene graph based interface, for example, a scene graph based zoomable interface, the system includes a tree structure that contains information about the objects to be rendered for display, as well as "cameras" for providing different views. Each visual information object and camera is represented by a node on the tree structure. As objects are moved, their position within the scene graph will correspondingly change. In this invention, returning to a previously viewed object, i.e., restoring a view, is similar to restoring the "camera" to a place in a scene graph.

Restoring the camera in the scene graph, however, may not by itself be enough to restore a view place, because objects in the view place may have shifted since last visit due to operations performed by others while the user's camera was in other view places or due to operations performed by the user during intervening visits to the view place. In other words, it is possible that the information of interest that the user viewed during the previous visit might not be made visible by simply restoring the view because the information may have been panned or scrolled out of sight. Therefore, the definition of the state of a view place may include both location and other information such as a panning state and/or a scrolling state of the objects and/or sub-objects in the view place.

The manipulation of information in a workspace, such as a zoomable workspace, often involves many small moves of objects in the workspace around essentially the same view place, followed by jumps or navigation to distant view places. From the perspective of keeping history of view places to which the user's focus has moved (e.g., places at which objects are visited, added, edited, moved and/or deleted), it is useful to treat small variations or moves of a view place and/or an object in a view place as equivalent, rather than as completely separate view places to which a user might want to return.

Panning and other object navigation events are examples of events that may be used as triggers for memorizing a view place. When such a trigger occurs, information of the view place is collected for saving and characterizing the state and properties of the view place into a record in a history list.

For instance, when the user initiates a panning operation of a view place, it may be determined whether the shift in the view place is greater than a predetermined threshold, such as 80% of a width or height dimension of the view place. If the shift is greater than the threshold, the view place before the change is treated as a distinct view place, and stored as part of the history list. If the shift is below the threshold, the new view place is treated as a continuation of the same view place and the new location is used as an updated location for the "same" view place.

When a view place is stored in the history list, the information of the view place is governed by a degree-of-interest (DOI) function as discussed below.

To represent the state of a view place and/or an object, a state of a view place and changes of the object may be recorded. For example, if an object is moved from one location to another location, this change may be recorded. The time of last visit, duration of the last visit, category of work done during the visit, and/or amount of work done during the visit, for example, may also be recorded as properties of the user's focus with respect to the object.

To effectively return to a previous view place, when to "memorize" a view place within the workspace is decided based on the history list. Some possible previous view places to visit may be more interesting than others. A degree-of-interest (DOI) function can be applied to filter through the possible view places for navigation and determine which view places are more interesting or important than others. Below are examples of rules that could be used in a DOI function for view places.

View places visited recently are more interesting than view places that have not been visited for a while.

View places in which the user spent a lot of time are more interesting than view places in which the user worked only briefly.

View places in which the user wrote new information are more interesting than view places in which the user merely did searching, and view places in which the user did searching are more interesting than view places in which the user only did reading.

A degree-of-interest function may be computed in various ways. One way is to use a weighted sum of the values of the properties of interest for a view place, as in the following exemplary equation:

$$DOI \text{ (view place)} = w_1 \text{ (recency metric)} + w_2 \text{ (visit length metric)} + W_3 \text{ (work category metric)}$$

where $w_1$, $w_2$, and $w_3$ are predetermined weights. The history list can then be stored in a memory, such as a cache memory. The system keeps a list of possible view places of interest to which the user may want to return. This DOI function may be used to prioritize the view places or to govern which view places to "remember" (i.e., store) and which to "forget" (i.e., discard).

FIG. 4 illustrates an exemplary way of maintaining the history list. As view places are visited, a history list of the view places is maintained. A degree of interest is computed for each view place visited by the user, and is recorded in the history list along with location information of the view place. If the list only allows a predetermined maximum number of view places to be recorded, then the view place on the list with the lowest degree of interest (i.e., view place #751 in FIG. 3) may be "forgotten", i.e., discarded, whenever a new view place with a higher degree of interest (e.g., view place #729) is found, and the new view place may be inserted into its proper view place in the list based on its degree of interest.

However, when a record of a new view place is proposed for insertion into the history list, another record of the same view place, or substantially the same view place, may already exist in the history list. If so, a determination may be made as to whether the new view place should be recorded as a new entry, or as an update for the previously recorded view place by, for example, determining whether a difference in location between the new view place and the view place already recorded in the history list is greater than or equal to a predetermined threshold. For instance, if two view places share the same space by more than a predetermined threshold (such as 20%), then the two view places may be treated as equivalent. In this case, the new record of the newer view place may replace the record of the older view place in the history list. A variation or extension on this rule would alter the visit length metric for the replaced record to combine the visit times of the two separate visits by, for example, a simple addition or by a weighted addition that discounts the time of the older visit by some factor.

It will be appreciated that various other ways and/or criteria to determine equivalence are possible. For example, if one view place has five objects in view, and another view place has at least a certain number or percentage of the same five objects in view, then the two view places might be considered equivalent. As another example, view places might be considered equivalent if the same types of activities have been performed at one or more of their respective objects. Those skilled in the art will also appreciate various weighting schemes and/or ways of combining the metrics.

Furthermore, when a user leaves a view place, he/she may no longer be aware of changes occurring to objects at that view place. As a result, upon returning to that view place, the user may no longer recognize the place or remember what was happening on the previous visit. It may be necessary to provide cues to recreate the place as the user remembers it.

To solve these problems, the system may implement one or more techniques for enhancing familiarity. One exemplary technique for enhancing familiarity may be animation. For example, when a user returns to a view place where objects have been modified, the display may quickly animate from a view of the view place as it was last seen, to its current, modified state. Other techniques may also be used, solely or in combination, such as animated highlighting.

Various user interfaces that enable the user to return to an earlier view place are introduced below. In the following exemplary interfaces, it is assumed that a history list has been created, as described above, as the user has navigated view places in a workspace.

In exemplary embodiments according to this invention, the location and other information of view places may be saved automatically, with an equivalence function for combining small moves into a single location and/or a DOI function for determining what to remember and or what to forget, as described in detail above. It should be appreciated that the location and other information of a view place list may alternatively be saved by a separate, explicit user action, such as manually designating a particular view place to be memorized.

Some interfaces for navigating a workspace may convey an amount of information that depends on the space resources that are available for representing a view place. For example, if there is only a small amount of display space, a small icon or shaded square may be used to indicate a view place. The degree of shading of the icon or square, for example, may indicate the recency of the view place. If more display space is available, a symbolic representation of recency, such as a numerical value (e.g., time and/or date) may be used. If even more display space is available, other properties may be displayed, such as a label of the object, a summary of information that was changed, and/or a code indicating the kind of activity (reading, writing, searching, etc.) that the user was engaged in at the view place. A stored view or enhanced thumbnail view of each of the possible view places for navigation may also be displayed. In embodiments, the amount of display space allocated for representing a view place may differ from view place to view place according to a DOI function.

A graphical user interface (GUI), such as a back button, may be used for initiating to return to a previous view place on the history list. Actuating the button using a user input device, such as a mouse, may bring the user to the most recent previous view place in the history list, and actuating the button several times may take the user back several hops in time to previous view places where work had been done in accordance with the history list. In addition, unlike a conventional back button, the back button may be constituted such that holding the button for a predetermined length of time, such as one second, causes the system to cycle back through the previously visited view places recorded in the history list at a predetermined rate, such as a half second per view place. It may be useful to include a "forward" button for the user to forward through view places stored in the history list.

Figure 5:
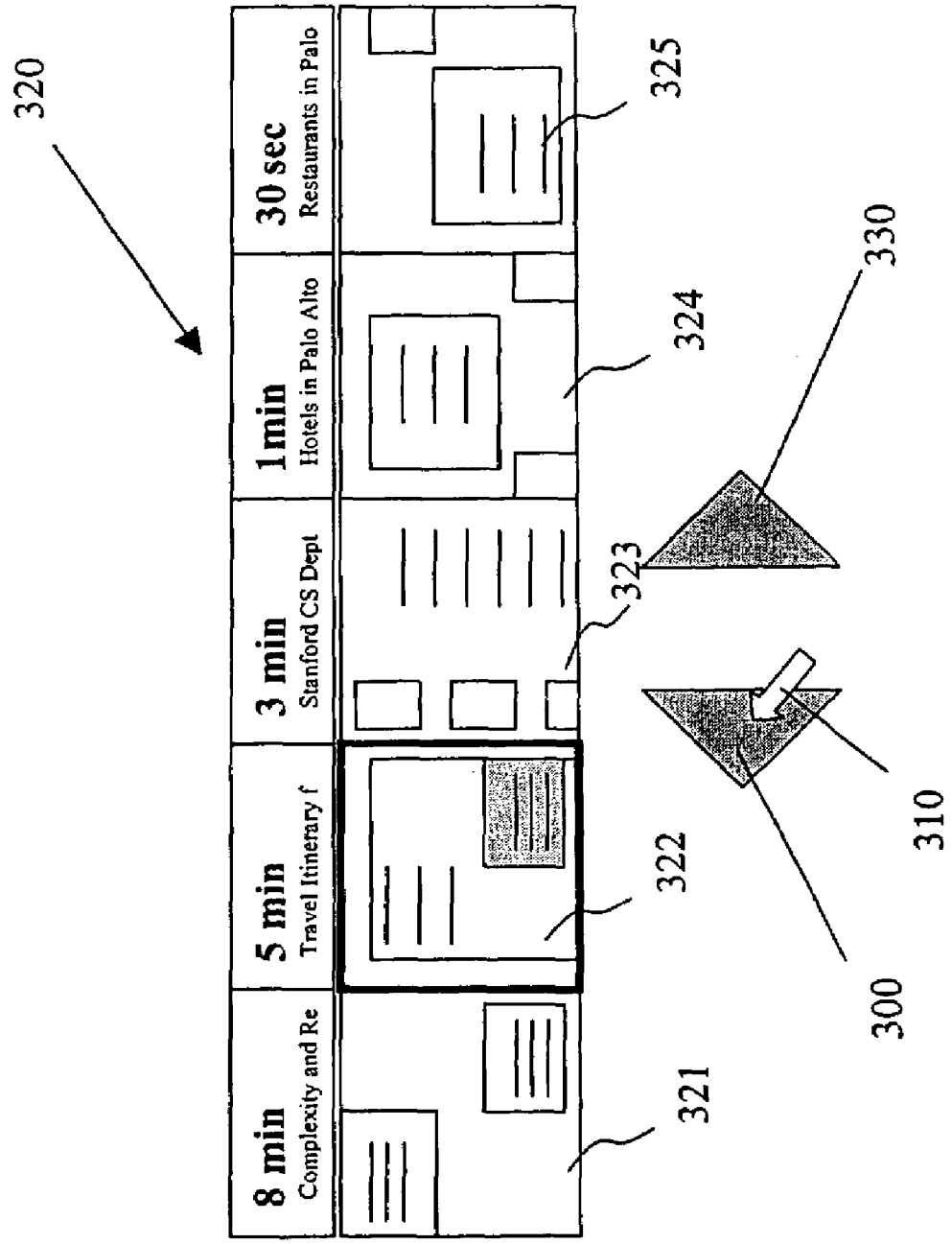
FIG. 5 shows an exemplary embodiment of an interface for navigating a workspace.

An interface may allow a user to consider multiple candidate navigations at once and to directly select any desired view place from among the view places included on the menu. FIG. 5 illustrates an example of such an interface.

In the example shown in FIG. 5, the user may select the "back" button 300 by moving a cursor 310 using a user input device, such as a mouse, over the "back" button 300, and "clicking" it. In response, a menu 320 of view places may be displayed to which the user can return. Alternatively, the menu 320 may already be displayed. In this case, the "back" button 300 may be unnecessary.

Information of view places is retrieved from a memory based on the history list. In this example, 5 view places are represented as annotated thumbnails 321-325 ranging in recency from, for example, 8 minutes to 30 seconds. In addition to the recency information, the thumbnails 321-325 may also show the subject matter of objects in which activities were performed during the respective time period.

In addition, as the user moves the cursor 310 over one of the thumbnails 321-325 shown in FIG. 5, the thumbnail current under the cursor 310 may be highlighted or enlarged.

Figure 6:
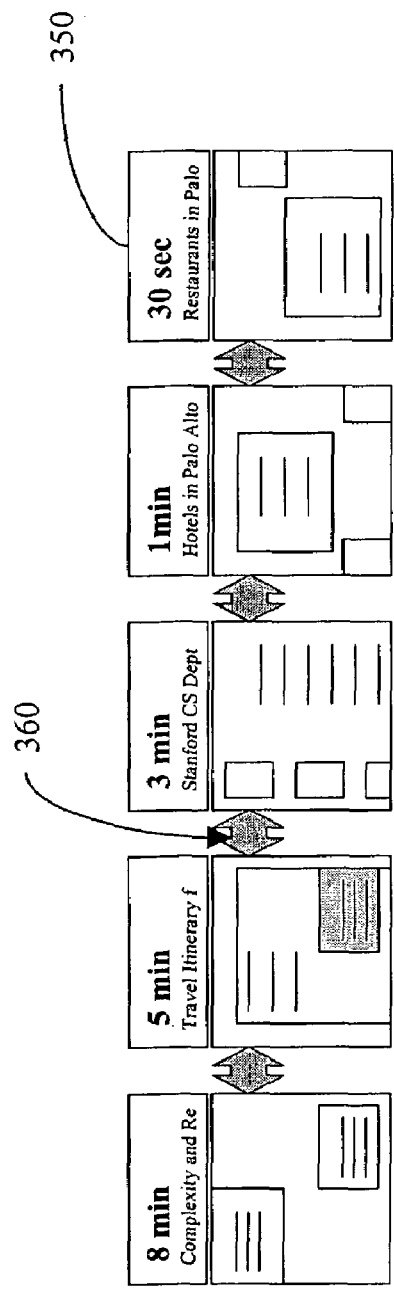
FIG. 6 shows another exemplary embodiment of an interface for navigating a workspace.

As one variation, the selection interface may incorporate zooming capabilities into the selection process. Examples of such interfaces are illustrated in FIGS. 6 and 7.

In the example shown in FIG. 5, the system may show thumbnails of the recorded view places in order of recency. Alternatively, the system may show the thumbnails in order of the DOI ranking, or in some other order. In FIG. 6, view places visited at 30 seconds ago, 1 minute ago, 3 minutes ago, 5 minutes ago and 8 minutes ago are shown respectively as thumbnails 350. Selectable regions 360 between the thumbnails 350 may provide options for the user to select if he/she wants to consider view places at intermediate times that have been ranked with a lower DOI.

Figure 7:
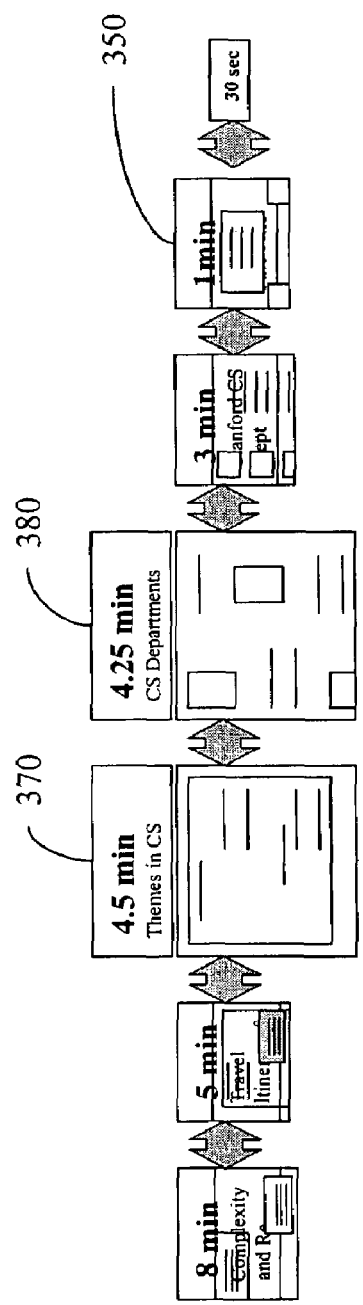
FIG. 7 shows yet another exemplary embodiment of an interface for navigating a workspace.

FIG. 7 shows an example of what may happen if the user moves the cursor over and selects one of the selectable regions 360. In this event, less display space is provided to each of the thumbnails 350, and display space is allocated for icons representing one or more view places of intermediate time (and lower DOI), e.g., thumbnails 370-380. The size of the views of the thumbnails 350 may be simply further reduced, or animated transition may be presented by, for example, using a zooming technique disclosed a system disclosed in co-pending, co-assigned U.S. patent application Ser. No. 10/369,613 entitled "Methods and Systems for Incrementally Changing Text Representation," incorporated herein by reference in its entirety. The user can then select from among those intermediate view places, using the selection procedures described above.

In various exemplary embodiments, the user may search for views containing specified content. An option may be provided for the user to enter keywords for searching a history list and/or thumbnails of view places that contain text matching the keywords. The matching text may be highlighted.

In addition to the automated classification of view places, the user may also manually designate view places for future navigation. Unlike web browsers, such a manual designation can appear in the actual workspace to indicate the presence of the designation. The manual designation may be presented in form of an icon or sign, for example.

Figure 8:
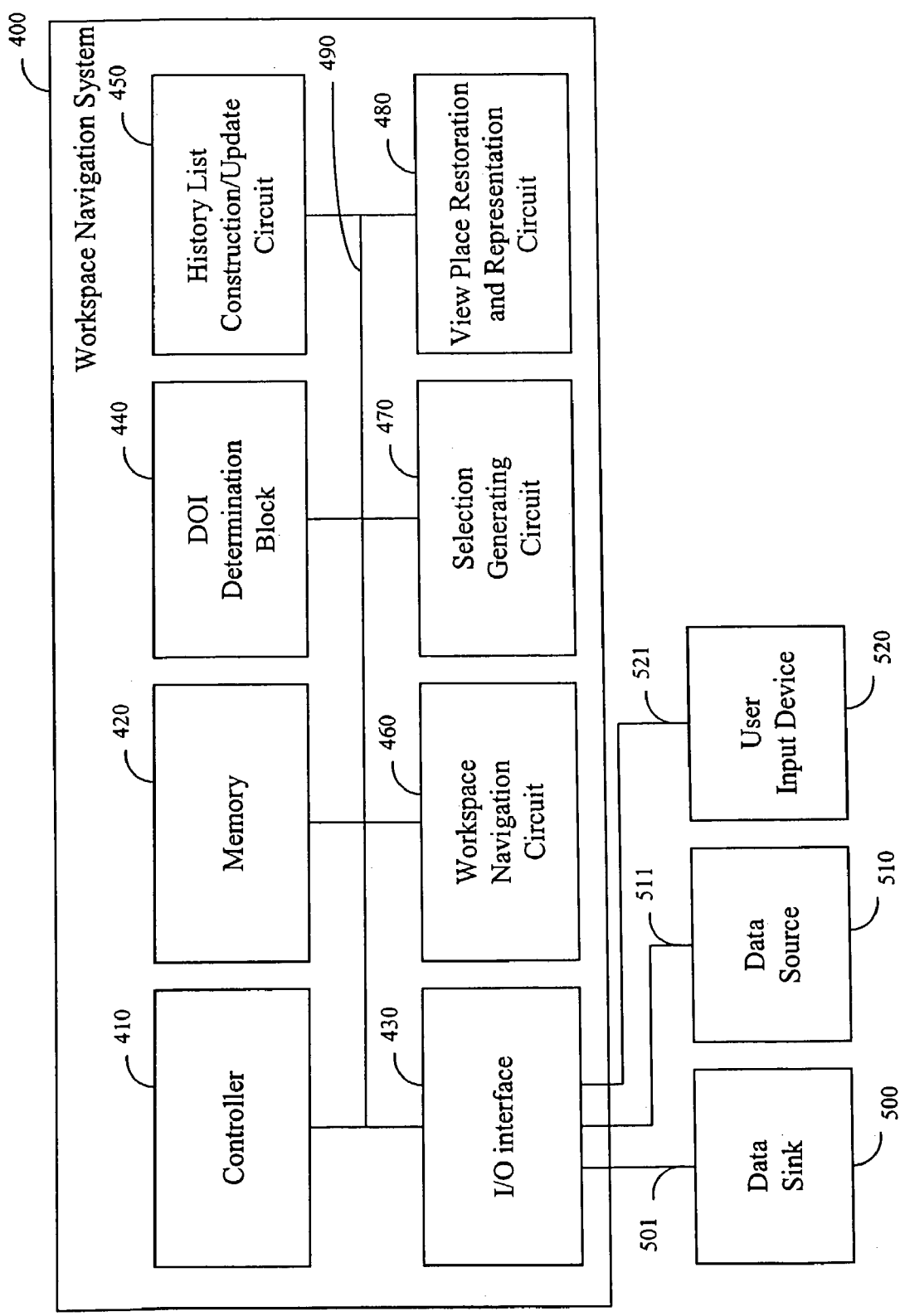
FIG. 8 is a block diagram showing an exemplary workspace navigation system according to this invention.

FIG. 8 shows a block diagram of an exemplary workspace navigation system 400 according to this invention. The workspace navigation system 400 includes a controller 410, a memory 420, an input/output (I/O) interface 430, a DOI determination block 440, a history list construction/update circuit 450, a workspace navigation circuit 460, a selection generating circuit 470, and a view place restoration and representation circuit 480, all of which are interconnected by a communication link 490.

The controller 410 controls data flow between other components of the workspace navigation system 400. The memory 420 may serve as a buffer for information coming into or going out of the system 400, may store any necessary programs and/or data for implementing the functions of the workspace navigation system 400, and/or may store data and/or thumbnails at various stages of processing.

Alterable portions of the memory 420 may be, in various exemplary embodiments, implemented using static or dynamic RAM. However, the memory 420 can also be implemented using a floppy disk and disk drive, a writable or rewritable optical disk and disk drive, a hard drive, flash memory or the like.

The input/output interface 430 provides a connection between the workspace navigation system 400 and a data sink 500, a data source 510, and a user input device 520. The data link 500, data source 510 and user input device 520 are connected to the input/output interface 430 via communication links 501, 511 and 521, respectively.

The degree of interest (DOI) determination block 440 determines the degree of interest of the user with respect to each workspace visited by determining, for instance, the length of time the user spends in the workspace. Further details of the workspace determination block 440 will be described hereafter.

The history list construction/update circuit 450 creates, records and maintains a history list that lists view places of a workspace according to degree of interest, determined by the DOI determination block 440, and stores information, such as location information and a panning state and/or a scrolling state of the view place to be recorded.

The workspace navigation circuit 460 navigates the user to previously visited workspaces listed based on the history list, and returns the user to the most current view place, as appropriate. The selection generating circuit 470 generates a selection of possible view places for navigation, based on the records contained in the history list. The selection generation circuit 470 may optionally generate thumbnails of the previous view places in the history list, for example. The thumbnails may be arranged in order of the recency of the recorded view places.

The view place restoration and representation circuit 480 provides a representation of a previous view place based on the user's selection of one of the previous view places. The view place restoration and representation circuit 480 may also provide animation of changes in objects in the previous view places since the last visit.

The data sink 500 can be any known or later-developed device that is capable of outputting or storing the processed media data generated using the systems and methods according to this invention, such as a display device, a printer, a copier or other image forming device, a facsimile device, a memory or the like. In the exemplary embodiments, the data sink 500 is assumed to be a display device, such as a computer monitor or the like, and is connected to the workspace navigation system 400 over the communications link 501.

The data source 510 can be a locally or remotely located computer sharing data, a scanner, or any other known or later-developed device that is capable of generating electronic media, such as a document. The data source 510 may also be a data carrier, such as a magnetic storage disc, CD-ROM or the like. Similarly, the data source 510 can be any suitable device that stores and/or transmits electronic media data, such as a client or a server of a network, or the Internet, and especially the World Wide Web, and news groups. The data source 510 may also be a television, a video tape player or any known or later developed device that broadcasts media data.

The electronic media data of the data source 510 is typically text data, but may also be a scanned image of a physical document or a photograph, video recordings, media data created electronically using any software, such as word processing software, or media data created using any known or later developed programming language and/or computer software program, the contents of an application window on a user's desktop, e.g., the toolbars, windows decorations, and spreadsheet shown in a spreadsheet program, a video image, or any other known or later-developed data source.

The user input device 520 may be any known or later-developed device that is capable of imputing data and/or control commands to the workspace navigation system 400 via the communication link 521. The user input device may include one or more of a keyboard, a mouse, a touch pen, a touch pad, a pointing device, or the like.

The communication links 501, 511 and 521 can each be any known or later-developed device or system for connecting the data sink 500, the data source 510, and the user input device 520, respectively, to the workspace navigation system 400, including a direct cable connection, a connection over a wide area network or local area network, a connection over an intranet, a connection over the Internet, or a connection over any other distributed processing network system. Further, it should be appreciated that the communication links 501, 511 and 521 can be, a wired wireless or optical connection to a network. The network can be a local area network, a wide area network, an intranet, the Internet, or any other known or later-developed other distributed processing and storage network.

Figure 9:
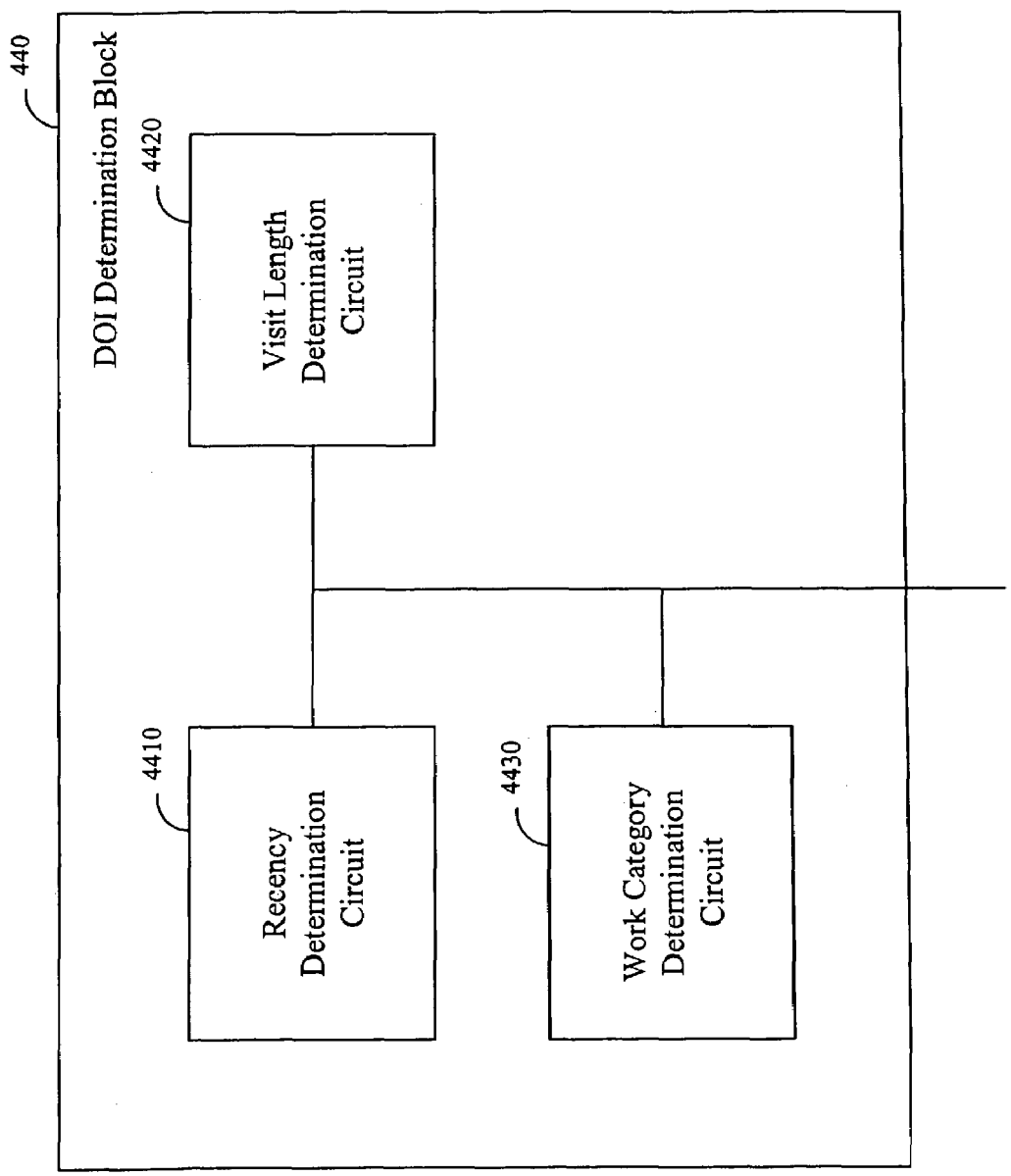
FIG. 9 is a block diagram showing an exemplary workspace determination block according to this invention.

FIG. 9 shows a block diagram of the workspace determination block 440. As shown, the workspace determination block 440 may include a recency determination circuit 4410, a visit length determination circuit 4420, and/or a work category determination circuit 4430. The recency determination circuit 4410 determines how recently a view place was visited and may, for example, give more weight to view places that were visited recently than view places that have not been visited for a while. The visit length determination circuit 4420 determines the length of time the user spent in a view place, and may, for example, give more weight to view places in which the user spent more time than view places in which the user spent less time. The work category determination circuit 4430 determines what type of work the user performed in a view place, and may, for example, give more weight to view places in which the user input information than view places in which the user merely searched or read the contents of the view place.

Figure 10:
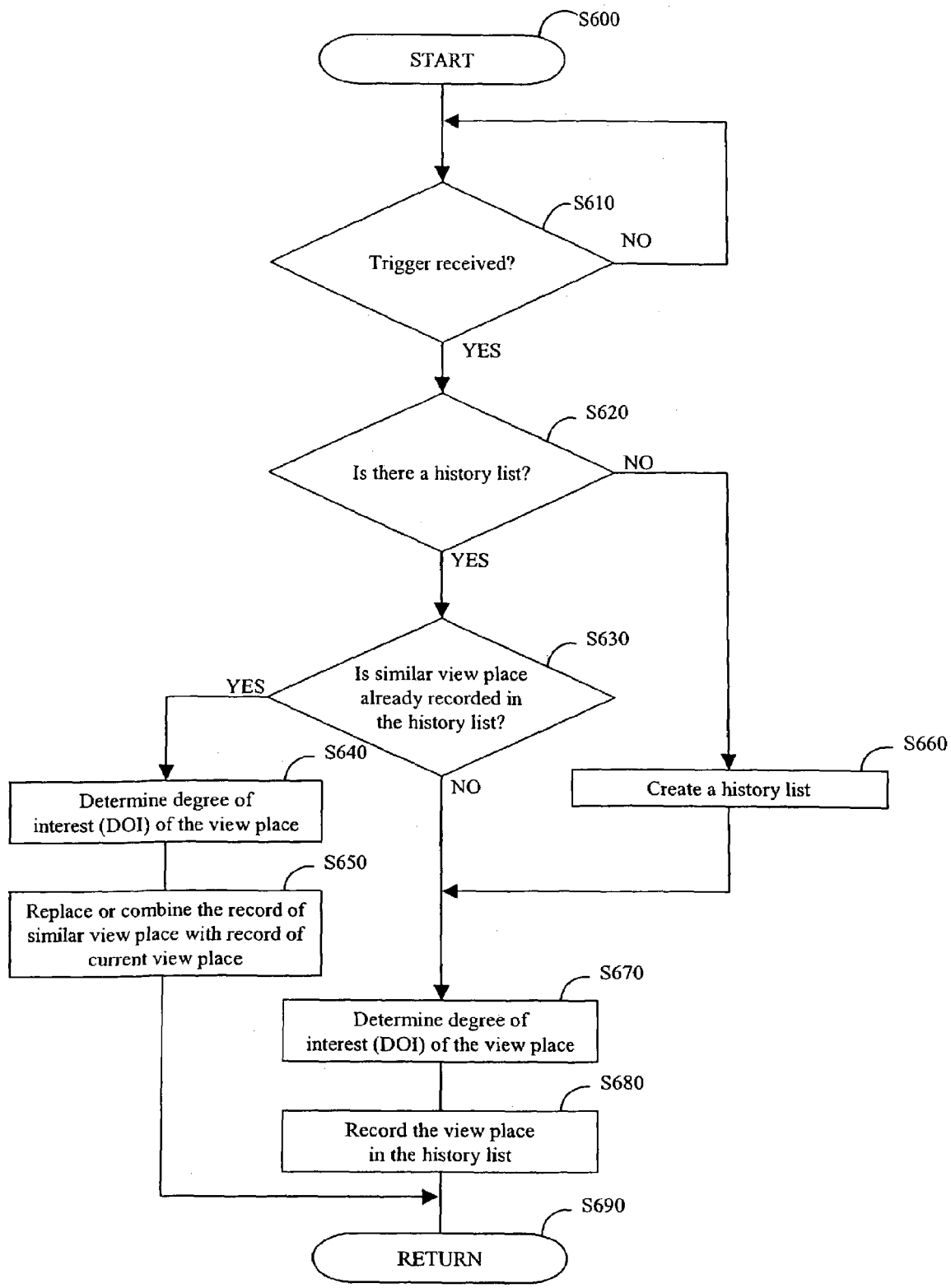
FIG. 10 is a flowchart showing an exemplary method of constructing and updating a history list according to this invention.

FIG. 10 shows an exemplary method of constructing a history list for navigating a workspace according to this invention.

The process begins at step S600 and continues to step S610. At step S610, a determination is made as to whether a trigger to record a view place in a history list is received. If so, the process goes to step S620; otherwise, the process repeats step S610.

In step S620, a determination is made as to whether there is a history list. If there is a history list, the process moves to step S630; otherwise, the process moves to step S660. In step S630, a determination is made as to whether a similar view place has already been recorded in the history list. If so, the process goes to step S640. If not, the process moves to step S670.

In step S640, a degree of interested is determined for the view place, and the process goes to step S650. In step S650, the record of the similar view place is replaced or combined with a record of the current view place, and the process jumps to step S690 and returns at step S690.

In step S660, a history list is created, and the process continues to step S670. In step 670, a degree of interest is determined for the view place, and the process moves to step S680. In step S680, information of the view place is recorded in the history list. The process continues to step S690 and returns.

Figure 11:
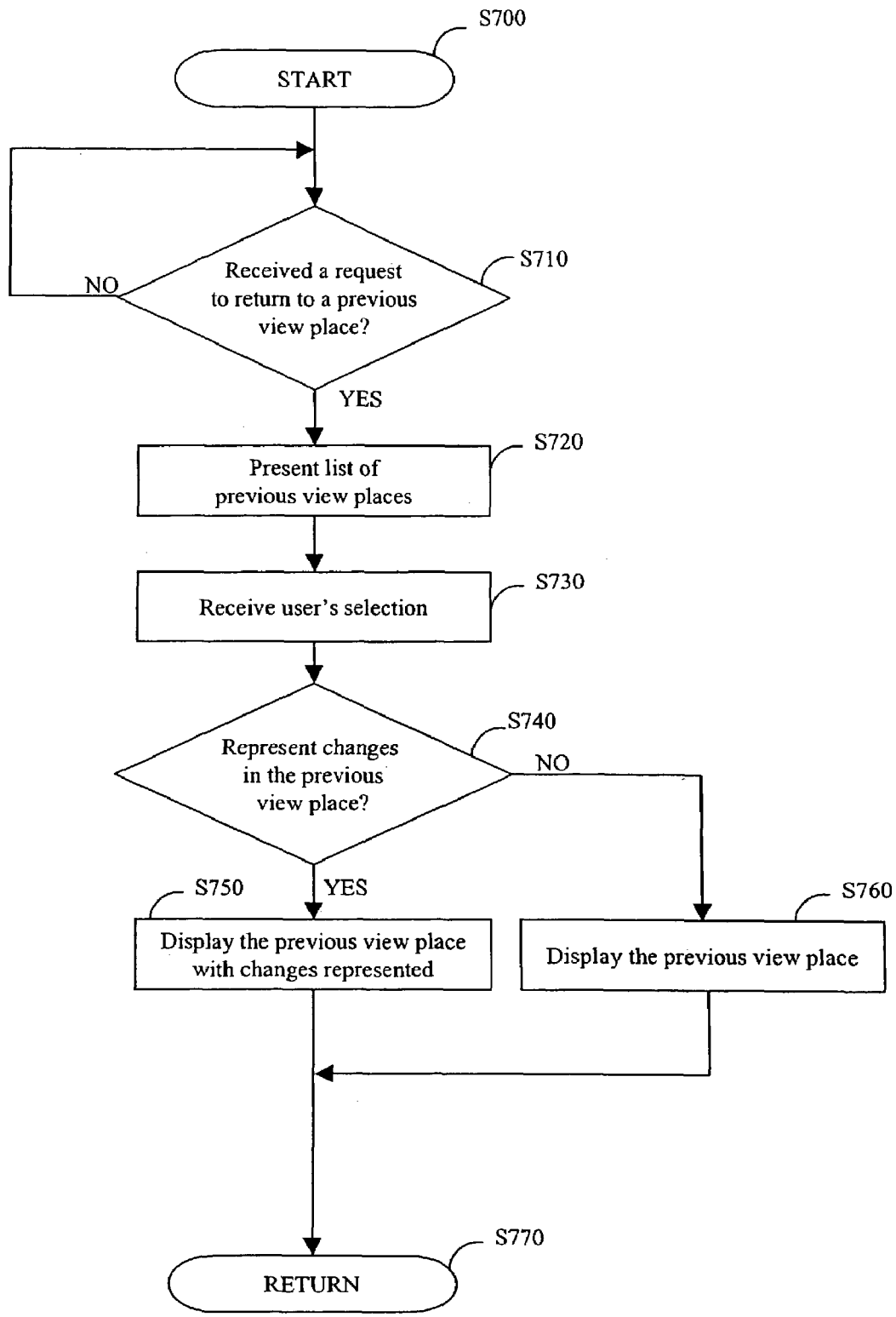
FIG. 11 is a flowchart showing an exemplary method of navigating a workspace according to this invention.

FIG. 11 shows an exemplary method of navigating a workspace.

The process starts at step S700 and continues to step S710. In step S710, a determination is made as to whether a request to return to the previous view place is received from the user. This step is repeated until a request has been received. The process then continues to step S720.

In step S720, a list of recorded previous view places for navigation is presented. In step S730, a selection is received from the user, and the process continues to step S740.

In step S740, a determination is made as to whether changes in the previous view place are to be represented, e.g., by animation, highlighting or the like. If so, the process continues to step S750; otherwise the process jumps to step S760. In step S750, the previous view place is displayed with the changes represented. The process then continues to step S770 and returns.

In step S760, the previous view place is displayed. The process then continues to step S770 and returns.

Additionally, those skilled in the art will recognize many applications for the present invention include, but not limited to, document display devices, such as browser devices, that display applications of a personal computer, handheld devices, and the like. In short, the invention has application to any known or later-developed system and device capable of navigating a workspace.

The steps shown in FIGS. 10 and 11 are described in the given order for illustration purpose, and in various exemplary embodiments, the selection of the objects and determining, constructing and maintaining the history list, navigation of workspaces and the like described above, may be performed in different order and/or with additional or fewer steps.

For example, the user may be able to manually designate that a particular view place is to be recorded in the history list. More priority or higher weight for degree of interest may be assigned to such a particular view place when recorded in the history list.

In the exemplary embodiments outlined above, the workspace navigation system 400 can be implemented using a programmed general-purpose computer. However, the workspace navigation system 400 can also be implemented using a special purpose computer, a programmed microprocessor or microcontroller and peripheral integrated circuit elements, an ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flowcharts shown in FIGS. 10-12, can be used to implement the workspace navigation system 400.

Each of the circuits or routines and elements of the various exemplary embodiments of the workspace navigation system 400 outlined above can be implemented as portions of a suitable programmed general purpose computer. Alternatively, each of the circuits and elements of the various exemplary embodiments of the workspace navigation system 400 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the workspace navigation system 400 outlined above will take is a design choice and will be obvious and predictable to those skilled in the art.

Moreover, the exemplary embodiments of the workspace navigation system 400 outlined above and/or each of the various circuits and elements discussed above can each be implemented as software routines, managers or objects executing on a programmed general purpose computer, a special purpose computer, a microprocessor or the like. In this case, the various exemplary embodiments of the workspace navigation system 400 and/or each or the various circuits and elements discussed above can each be implemented as one or more routines embedded in the communication network, as a resource residing on a server, or the like. The various exemplary embodiments of the workspace navigation system 400 and the various circuits and elements discussed above can also be implemented by physically incorporating the workspace navigation system 400 into a software and/or hardware system, such as the hardware and software system of a web server or a client device.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for navigating in a two-dimensional sensemaking workspace containing information objects, at least one of the information objects being created by a user at a view place in the two-dimensional workspace, comprising steps of:

identifying view places that the user has visited;

obtaining a history list, the history list including at least a degree of interest of one or more previous view places and location information indicating the position of the one or more previous view places in the two-dimensional workspace; and navigating to view places of the workspace based on the history list.

2. The method of claim 1, wherein the navigating step comprises:

retrieving the location information related to the one of the one or more previous view places from the history list; and displaying the one of the one or more previous view places based on the location information.

3. The method of claim 1, further comprising a step of representing changes in the one of the one or more previous view places that have occurred since a most recent visit, wherein the changes include at least one of modification, addition and deletion of an object in the one of the one or more previous view places.

4. The method of claim 3, wherein the representing step includes at least one of animating transition of the changes and highlighting the changes.

5. The method of claim 1, wherein the sensemaking workspace is zoomable.

6. The method of claim 1, further comprising providing a selection of the one or more previous view places for navigation.

7. The method of claim 6, wherein the selection is provided using one or more graphical interfaces.

8. The method of claim 7, wherein the one or more graphical interfaces include at least one a thumbnail and a visual indication of recency of respective one of the one or more previous view places.

9. The method of claim 8, wherein the at least one thumbnail is scaled using a degree of interest function.

10. The method of claim 1, further comprising constructing the history list, wherein the constructing step comprises:
   detecting a work activity in a current view place;
   determining a degree of interest of the current view place based on the work activity; and
   storing the degree of interest and the location information.

11. The method of claim 10, wherein the constructing step further comprises:
   determining whether the current view place is similar to one of the one or more previous view places; and
   updating the degree of interest and the location information of the one of the one or more previous view places with the degree of interest and the location information of the current view place when it is determined that the current view place is similar to one of the one or more previous view places.

12. The method of claim 1, wherein the degree of interest is determined by at least one of recency of a most recent visit to each view place, duration of the most recent visit to each view place, category of work during the most recent visit to each view place, and amount of work done during the most recent visit to each view place.

13. A method of constructing a history list of visited view places in a sensemaking two-dimensional workspace, comprising steps of:
   automatically saving information for computing degree of interest when a user visits a view place, the information including at least one of the time that the user entered the view place, the amount of time that the user spent at the view place before leaving the view place, and the category of work done at the view place;
   using the saved information to automatically compute a degree of interest for the previously visited view places when a user requests a history list; and
   using the degree of interest to identify and present view places in a history list to the user.

14. The method of claim 13, further comprising:
   determining whether a current view place is similar to one of the one or more previous view places; and
   updating the degree of interest and location information of the one of the one or more previous view places with the degree of interest and location information of the current view place when it is determined that the current view place is similar to one of the one or more previous view places.

15. The method of claim 13, wherein the category of work includes at least one of visiting a view place, searching in a view place, and modifying an object in a view place.

16. The method of claim 15, wherein the degree of interest is determined at least one of recency of a most recent visit to the current view place, duration of the most recent visit to the current view place, category of work during the most recent visit to the current view place, and amount of work done during the most recent visit to the current view place.

17. A method for navigating a sensemaking two-dimensional workspace containing information objects, at least one of the information objects being created by a user at a view place in the two-dimensional workspace, the workspace comprising one or more view places linked by a network, the method comprising;
   identifying view places that the user has visited;
   obtaining a history list, the history list including at least a degree of interest and location information related to one or more previous view places, the degree of interest being determined by at least one of category of work performed during the most recent visit to each view place and amount of work done during the most recent visit to each view place; and
   navigating to view places of the workspace based on the history list.

18. The method of claim 17, wherein the degree of interest is determined by category of work performed during the most recent visit to each view place.

19. The method of claim 17, wherein the degree of interest is determined by amount of work done during the most recent visit to each view place.

20. A two-dimensional sensemaking workspace navigation system containing information objects, at least one of the information objects being created by and positioned by a user at a view space in the two-dimensional workspace, comprising:
   a history list construction and update circuit that identifies view places that the user has visited and obtains a history list, the history list including at least a degree of interest of one or more previous view places and location information indicating the position of the one or more previous view places in the two-dimensional workspace; and
   a workspace navigation circuit that navigates to view places of the workspace based on the history list.

21. The system of claim 20, wherein the workspace navigation circuit retrieves the location information related to the one of the one or more previous view places from the history list, and causes one of the one or more previous view places to be displayed based on the location information.

22. The system of claim 20, further comprising a view place restoration and representation circuit that represents changes in the one of the one or more previous view places that have occurred since a most recent visit, wherein the changes include at least one of modification, addition and deletion of an object in the one of the one or more previous view places.

23. The system of claim 22, wherein the view place restoration and representation circuit provides at least one of animating the change and highlighting the changes.

24. The system of claim 20, wherein the sensemaking workspace is zoomable.

25. The system of claim 20, further comprising a selection generating circuit that provides a selection of the one or more previous view places for navigation.

26. The system of claim 25, wherein the selection generating circuit provides the selection using one or more graphical interfaces.

27. The system of claim 26, wherein the one or more graphical interfaces include at least one of a thumbnail and a visual indication of recency of respective one of the one or more previous view places.

28. The system of claim 27, wherein the history list construction and update circuit scales the at least one thumbnail using a degree of interest function.

29. The system of claim 20, wherein the history list construction and update circuit detects a work activity in a current view place, determines a degree of interest of the current view place based on the work activity, and stores the degree of interest and the location information.

30. The system of claim 29, wherein the history list construction and update circuit determines whether the current view place is similar to one of the one or more previous view places, and updates the degree of interest and the location information of the one of the one or more previous view places with the degree of interest and the location information of the current view place when it is determined that the current view place is similar to toneone of the one or more previous view places.

31. The system of claim 20, further comprising a DOI determination circuit that determines the degree of interest by at least one of recency of most recent visit to each view place, duration of a most recent visit to each view place, category of work during the most recent visit to each view place, and amount of work done during the most recent visit to each view place.

32. A history list construction and update system for constructing a history of visited view places in a sensemaking two-dimensional workspace, comprising
   a history list construction and update circuit that automatically saves information for computing degree of interest when a user visits and works on a view place, the information including at least one of the time that the user entered the view place, the amount of time that the user spent at the view place before leaving the view place, and the category of work done at the view place;
   a degree-of-interest determination circuit that automatically computes a degree of interest for the previously visited view places when a user requests a history list;
   a memory that stores the degree of interest and location information of each view place; and
   a workspace navigation circuit that uses the degree of interest information to identify and present view places in the history list to the user.

33. The system of claim 32, wherein the history list construction and update circuit determines whether the current view place is similar to one of the one or more previous view places, and updates the degree of interest and location information of the one of the one or more previous view places with the degree of interest and location information of the current view place when it is determined that the current view place is similar to one of the one or more previous places.

34. The system of claim 32, wherein the work activity includes at least one of visiting a view place, searching a view place and modifying an object in a view place.

35. The system of claim 33, wherein the degree-of-interest determination circuit determines the degree of interest by at least one of recency of a most recent visit to the current view place, duration of the most recent visit to the current view place, category of work during the most recent visit to the current view place, and amount of work done during the most recent visit to the current view place.

36. A workspace navigation system that allows a user to navigate a sensemaking two-dimensional workspace containing information objects, at least one of the information objects being created by a user at a view place in the two-dimensional workspace, comprising:
   a history list construction and update circuit that identifies view places that the user has visited and obtains a history list, the history list including at least a degree of interest and location information related to the one or more previous view places, the degree of interest being determined by at least one of category of work performed during the most recent visit to the current view place and amount of work done during the most recent visit to the current view place; and
   a workspace navigation circuit that navigates to view places of the workspace based on the history list.

37. The system of claim 36, further comprising a degree-of-interest determination circuit determines the degree of interest by category of work performed during the most recent visit to the current view place.

38. The system of claim 36, further comprising a degree-of-interest determination circuit determines the degree of interest by amount of work done during the most recent visit to the current view place.

* * * * *